United States Patent [19]

Allen

[11] Patent Number: 5,527,408
[45] Date of Patent: Jun. 18, 1996

[54] METHOD AND APPARATUS FOR AUTOMATICALLY CONTROLLING THE MOISTURE CONTENT OF CORRUGATED BOARD

[76] Inventor: George H. Allen, 111 Magnolia Dr., Tyrone, Ga. 30290

[21] Appl. No.: 491,267

[22] Filed: Jun. 16, 1995

[51] Int. Cl.[6] .................................................. B32B 31/00
[52] U.S. Cl. ........................... 156/64; 156/351; 156/359; 364/471
[58] Field of Search ........................... 156/64, 350, 351, 156/359, 543; 364/471; 162/254, 262, 263

[56] References Cited

U.S. PATENT DOCUMENTS

| | | | |
|---|---|---|---|
| 3,004,880 | 10/1961 | Lord | 156/64 |
| 3,981,758 | 9/1976 | Thayer et al. | 156/64 |
| 4,038,122 | 7/1977 | DeLigt | 156/64 |
| 4,056,417 | 11/1977 | League, IV | 156/64 |
| 4,071,392 | 1/1978 | Chaudhuri | 156/351 |
| 4,134,781 | 1/1979 | Carstens et al. | 156/64 |
| 4,497,027 | 1/1985 | McGuire et al. | 364/471 |
| 4,589,944 | 5/1986 | Torti et al. | 156/359 |
| 5,244,518 | 9/1993 | Krayenhagen et al. | 156/64 |

Primary Examiner—David A. Simmons
Assistant Examiner—Paul M. Rivard
Attorney, Agent, or Firm—Hopkins & Thomas

[57] ABSTRACT

A method and apparatus for automatically controlling the moisture content of corrugated board manufactured along a corrugated board production line. Moisture control apparatus (5) has a top liner board moisture sensor (45) and a bottom liner board moisture sensor (46) stationed along the corrugated board production line (7) which read the moisture content percentage of the top liner board (12) and bottom liner board (23) of a combined corrugated board (38). The moisture control apparatus also includes a line speed sensor (47) which measures the line speed of the corrugated board production line. The moisture control sensors (45, 46) signal a central processing unit (50) with a signal proportional to the measured moisture content percentage of the top liner board and bottom liner board, respectively. Central processing unit (50) compares the data received from the moisture sensor against separate moisture content setpoints established for the top liner board and the bottom liner board, and in turn signals the wrap arms (26, 27) of a pre-heater assembly (20) for increasing or decreasing the amount of top liner board wrap along a portion of the heating drum (27, 31) of either a "B" flute wrap arm pre-heater assembly (25) or a "C" flute wrap pre-heater assembly (29). Central processing unit (50) also signals a wrap arm (34) of a bottom liner board wrap arm pre-heater assembly (33) to increase or decrease the amount of bottom liner board wrap in surface contact with heating drum (35) of bottom liner board wrap arm pre-heater assembly, so that the measured moisture content of the top liner board and bottom liner board falls within a deadband moisture content range.

25 Claims, 8 Drawing Sheets

METHOD AND APPARATUS FOR AUTOMATICALLY CONTROLLING THE MOISTURE CONTENT OF CORRUGATED BOARD

FIELD OF THE INVENTION

This invention relates in general to a method and apparatus for controlling the moisture content of corrugated board manufactured in a corrugated board production line. More particularly, this invention relates to both a method and an apparatus for automatically controlling the moisture content, and thus the warping, of corrugated board during its manufacture.

BACKGROUND OF THE INVENTION

The operation of corrugator machines and of corrugated board production lines, and the problems of warp generation resulting in the corrugated board during its manufacture are well known in the art. Board warp, or cupping, in corrugated board is caused by a moisture imbalance between the top liner board and bottom liner board of the combined corrugated board. As is known, the tips of a fluted web medium are glued to the top liner board forming a single face web. Downstream along the corrugated board production line, glue is applied to the exposed tips of the fluted web of the single face board to glue the single face board to the bottom liner board, also known as the double backer, thus forming the combined corrugated board.

The corrugating process is primarily a drying process involving the application of a water based adhesive glue, know within the corrugation board industry as starch, to the fluted web when gluing the web to the top liner or single face board, and then later applying glue to the bottom liner or double backer board to form the combined board. Heat is applied to the various components of the corrugated board at different steps in the process either to cure or dry the water in the starch mixture for causing the starch to bond to the paper surface of the top and bottom liner boards, respectively, resulting in a laminated structure which is rigid and from which strong boxes, for example, can be fabricated. However, when a difference in moisture content between the top liner board and bottom liner board in the combined board is present, which inevitably occurs during the drying process, the liner board which has a lower moisture content will shrink at a greater percentage rate than the liner board with the greater moisture content, resulting in a cup or warp in the combined board toward the relatively dryer liner board.

Thus, in an effort to address the cupping or warping of corrugated board during its manufacture, attempts have been made to provide devices which measure and control the temperature of the corrugated board during the manufacturing process in the attempt to control moisture content of the corrugated board components. Temperature, as is moisture content, is an important variable in the corrugating process, especially as it relates to starch formation and curing, and thus temperature has been more commonly used than moisture content measurement as a control factor in the production of corrugated board.

One example of the prior art is disclosed in U.S. Pat. No. 3,004,880 to Lord, issued Oct. 17, 1961. Lord discloses a control method and apparatus in which four pyrometers measure the temperature of the top liner board, the web medium, which later becomes the fluted web, the single face web, and the bottom liner board. Each pyrometer transmits an electrical signal proportional to each of the respective temperature conditions to an associated controller. Thereafter, when a production line operator visually observes cupping in the corrugated board, the operator will manually adjust any one or combination of the controllers to which the pyrometers provide data, the controllers in turn controlling the movement of the wrap arms associated with the cylindrical heating drums of conventional wrap arm heater assemblies stationed along the corrugated board production line to increase or decrease the temperature of the corrugated board.

In Krayenhagen et al., U.S. Pat. No. 5,244,518, issued Sep. 14, 1993, a corrugated board manufacturing apparatus and process is disclosed which includes steam dryer manifolds for zone drying of the web using pressurized steam to produce moisture to equalize the moisture content across the width of the corrugated board with respect to its length, the apparatus including moisture sensors and temperature sensors which transversely scan the web and provide feedback information regarding web moisture and temperature. Although Krayenhagen et al. measure moisture content across the width of the top liner board and bottom liner board, this information is used only to increase or decrease the amount of steam passed through steam manifolds provided to increase or decrease moisture content in the top liner board and bottom liner board, respectively.

Variations in moisture content of the components of the corrugated board arise for several reasons. The amount of water in the starch mixture can vary, so that the percentage of solids in the starch to water forming the glue mix is not uniform in the glue applied to the web medium as it is first glued to the top liner board, and later glued at a separate station to the bottom liner board. In addition, the amount of starch applied to the top and bottom liner boards can vary, which results in a variation of moisture being added to the liner board. Also, the moisture content in the top liner board, medium board, and bottom liner board can and does vary from board to board. This is largely due to the fact that each roll of board paper is approximately 6 to 7 ft. in diameter and will be several thousand feet long. Thus, each roll of board paper will have a moisture content different from that of every other roll used in the manufacturing process, and no roll of paper will have a uniform moisture content throughout its length.

Modern paper mills are capable of producing paper, i.e., the liner board and web board used in the corrugation process, which has little or no moisture variation in its width, also known as the cross machine direction. However, the same cannot be said for the variation of the moisture content along the length of the paper, this being known as the longitudinal or machine direction of the paper. Thus, it is important in the corrugated board manufacturing process to measure the machine direction or lengthwise moisture content variation of the board as opposed to its transverse or cross direction moisture content. This problem is amplified due to the fact that corrugated board production line operators are frequently required to obtain paper from several sources, so that in addition to moisture variations between roll to roll from the same paper manufacturer, moisture variations will also exist of either a greater or lesser amplitude between rolls of paper manufactured by other paper manufacturers. This results in a significant inconsistency in paper quality and in machine direction moisture content, which consequently leads to warp in the production of the corrugated board. Moreover, because the problem in controlling moisture content is believed to lie in the machine direction as opposed to the cross machine direction, measurement and control of cross machine moisture content tends not to be economically justifiable in relation to the cost of attempting to control cross machine moisture content in a single zone or through a plurality of zones, as is attempted by Krayenhagen et al., and McGuire et al., U.S. Pat. No. 4,497,027, issued Jan. 29, 1985.

McGuire et al. teaches a method and apparatus for preventing warp in the manufacture of corrugated boards by measuring moisture in the cross machine direction of the liner boards over a plurality of zones transverse to the direction of liner board travel. Thereafter, for each zone of each liner a zonal time averaged moisture value is calculated, and if the zonal time average difference is greater than a predefined average moisture content corrective action is taken by increasing or decreasing the amount of water sprayed onto the single face liner for that particular zone. In addition, if the average moisture content reading for both the single face and double face liners is taken together, and if the combined and averaged moisture content of the top and bottom liner boards is outside of a predetermined range, corrective action is taken by adjusting the pre-heater wrap arm angle for some, or all, of the liner boards.

None of the prior art known to the inventor discloses or illustrates a simple yet efficient method and apparatus for measuring moisture content in the machine direction of corrugated board and for automatically controlling wrap arm movement for the top liner board and bottom liner board wrap arm pre-heater assemblies in response thereto so that the moisture content of the top liner board and bottom liner board falls within a preset moisture content deadband range. Moreover, none of the prior art known to the inventor discloses or teaches a method and apparatus for the automatic control of moisture content of the top liner board separately and apart of the bottom liner board, so that the wrap arms of the pre-heater assemblies for the top liner board and for the bottom liner board are moved independently of each other against separate moisture content setpoints for controlling the moisture content, and thus warping, of the corrugated board as it is manufactured.

Thus, the need exists for an improved method and apparatus for automatically controlling the moisture content of corrugated board during its manufacture, in which the moisture content of the top liner board and bottom liner board of the combined corrugated board is measured in the machine direction of the board, and which allows the moisture content of the top liner board to be measured and adjusted independently of the measurement and adjustment of the moisture content of the bottom liner board in the corrugated board production line.

SUMMARY OF THE INVENTION

The present invention provides an improved method and apparatus for the automatic control of corrugated board warp in the manufacture of corrugated board which overcomes some of the design deficiencies of other control methods and apparatus known in the art by providing an automatic moisture control method and apparatus which separately measures the moisture content of the top liner board and of the bottom liner board in the machine direction of the combined corrugated board at separate stations fixed in position along the production line with respect to the width of the corrugated board. The present invention also provides an improved automatic moisture control method and apparatus which allows for the automatic control of moisture content in the top liner board separate and apart from the automatic control of moisture content in the bottom liner board so that both the top liner board and the bottom liner board can be driven to separate predefined moisture content setpoints for the purposes of providing greater flexibility, and thus control, for the prevention of warp in the corrugated board manufacturing process.

The improved automatic moisture control method described herein measures the moisture content of the top liner board and of the bottom liner board, and then calculates the difference between the measured moisture content of the top liner board against a first moisture content setpoint and the difference between the measured moisture content of the bottom liner board against a second and separate moisture content setpoint. Thereafter, the moisture control method of the present invention signals a first wrap arm pre-heater assembly if the difference in the moisture content between the first setpoint and the top liner board falls outside of the deadband moisture content range, and separately signals a second wrap arm pre-heater assembly if the difference in moisture content between the second setpoint and bottom liner board falls outside the deadband so that the wrap arms of top liner board and bottom liner board wrap arm pre-heater assemblies are each moved, respectively, in response to the signals generated by the apparatus so that the moisture content of the top liner board and of the bottom liner board is controlled to fall within the moisture content deadband range.

This method also provides for inputting a wrap arm jog duration time period within a computer processor for establishing the amount of time during which the wrap arms of the top liner board and bottom liner board wrap arm pre-heaters will be moved in response to the control signals to increase or decrease the amount of board wrap thereon, and thus the moisture content in the top liner board and bottom liner board, respectively, and then delaying the measurement of the moisture content of the top liner board and bottom liner board in response to the movement of the wrap arms.

The apparatus of this invention includes a pair of infrared moisture content sensors positioned along the corrugated board production line for measuring the moisture content of the top liner board and of the bottom liner board in the combined board downstream of the pre-heaters. The apparatus also includes a computer for processing the measured moisture content readings in conjunction with a first moisture content setpoint for the top liner board, a second moisture content setpoint for the bottom liner board, and a deadband moisture content range for both the top liner board and bottom liner board input into the computer, whereby the computer then calculates whether a difference exists between the first setpoint and the measured moisture content of the top liner board and between the second setpoint and the measured moisture content of the bottom liner board, and if so, then determines whether these differences fall outside of the deadband moisture content range to then generate a signal to the wrap arm of the top liner board pre-heater assembly and to the wrap arm of the bottom liner board pre-heater assembly, respectively, in response to the presence of a moisture content difference which falls outside of the deadband moisture content range.

Thus, it is an object of the present invention to provide an improved method and apparatus for the automatic control of moisture content in corrugated board which allows for the separate measurement and control of the moisture content in the top liner board and in the bottom liner board of the combined corrugated board.

It is an additional object of the present invention to provide an improved method and apparatus for the automatic control of moisture content in corrugated board which seeks to minimize board warp during manufacture of the corrugated board.

Another object of the present invention is to provide an improved method and apparatus for the automatic control of moisture content in corrugated board which provides greater flexibility during the corrugated board manufacturing process for the control of moisture content levels, and thus warping, within the combined corrugated board.

Still another object of the present invention is to provide an improved method and apparatus for the automatic control of moisture content in corrugated board which calculates and displays the average moisture content in the combined corrugated board to allow for improved control of the total moisture content in the board to prevent cracking of the board during the scoring of the board and conversion of the board into boxes and the like.

Yet another object of the present invention is to provide an improved method and apparatus for the automatic control of moisture content in a corrugated board assembled from conventional and relatively inexpensive components known in the art.

A further object of the invention is to provide an improved method and apparatus for the automatic control of the moisture content in corrugated board which may be easily retrofit to existing corrugator lines.

Another object of the present invention is to provide an improved method and apparatus for the automatic control of moisture content in a corrugated board which is simple in design and operation, is inexpensive to construct, and is durable in structure.

These and other objects, features, and advantages of the invention will become apparent upon reading the specification when taken into conjunction with the accompanying drawings.

DETAILED DESCRIPTION

Figure 1:
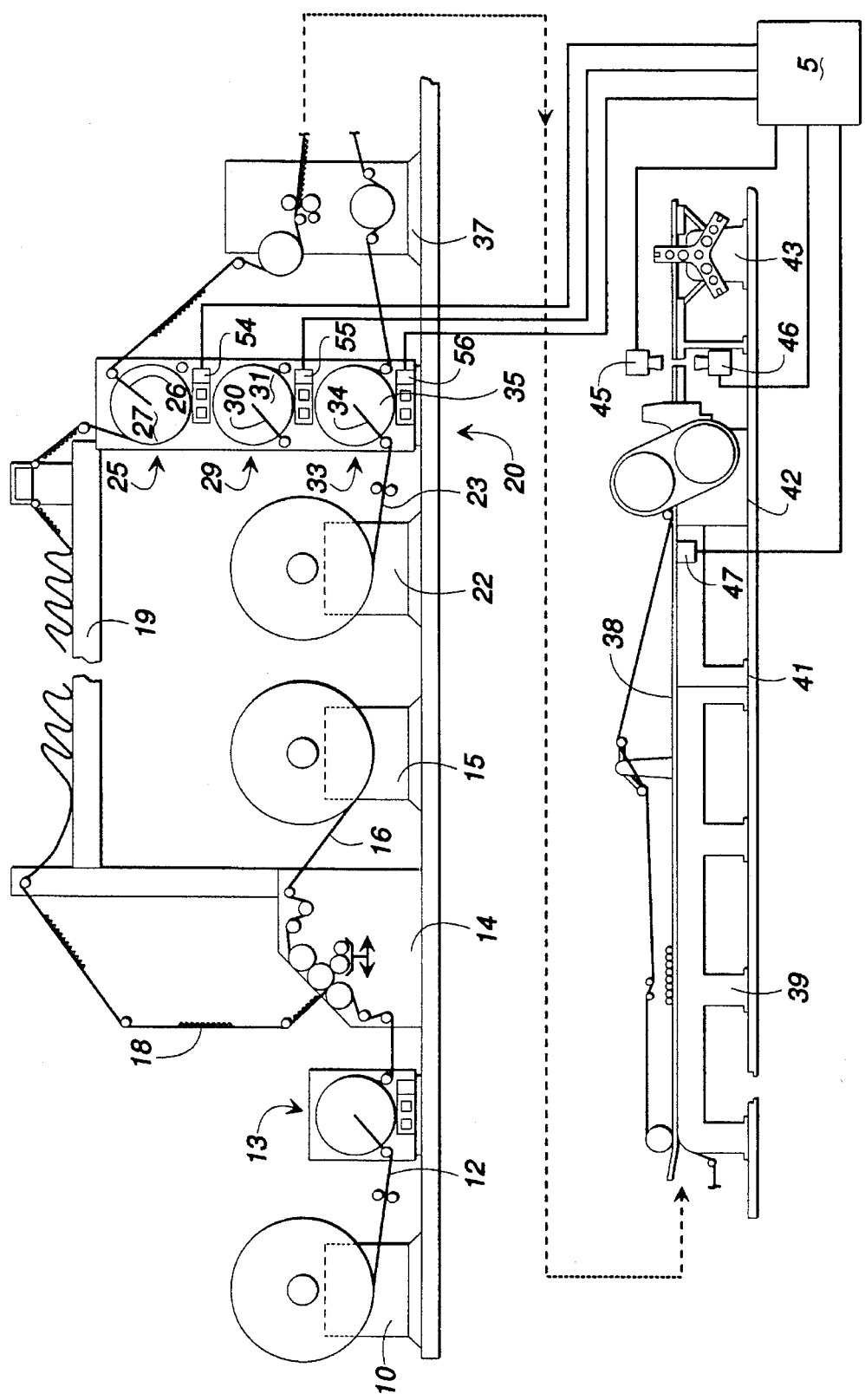
FIG. 1 is a schematic illustration of a corrugated board production line incorporating a preferred embodiment of the moisture control apparatus of this invention.
Figure 2:
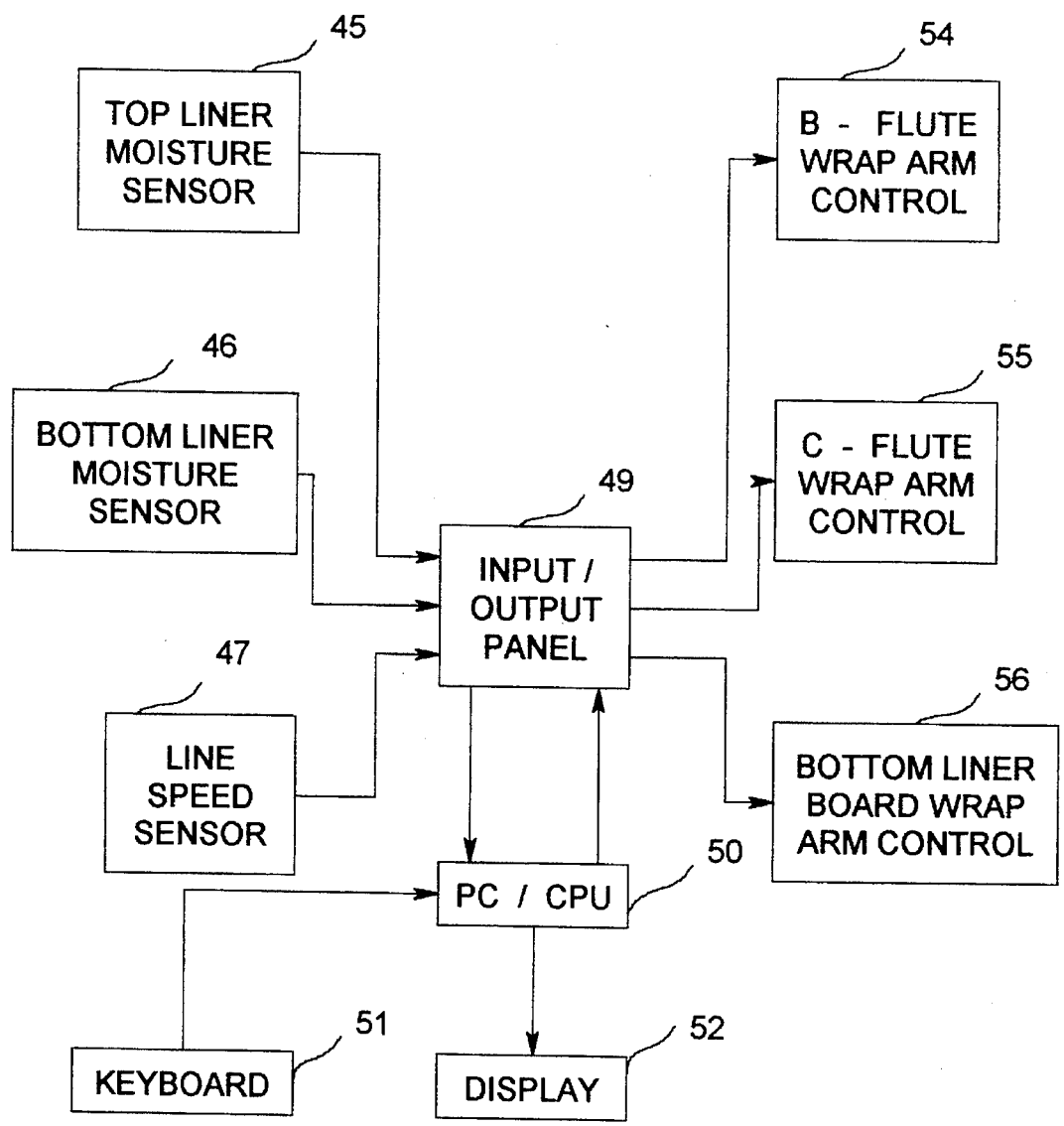
FIG. 2 is a block diagram illustrating the moisture control apparatus of FIG. 1.

Referring now in detail to the drawings, in which like reference numerals indicate like parts throughout the several views, numeral 5 of FIGS. 1 and 2 illustrates a preferred embodiment of an apparatus for automatically controlling the moisture content of corrugated board manufactured in a corrugated board production line 7 (FIG. 1). As moisture control apparatus 5 is used in conjunction with an otherwise conventional corrugated board production line 7, reference is made to FIG. 1 which shows a conventional corrugated board production line in schematic form.

Numeral 10 of FIG. 1 illustrates a top liner roll stand which supports a roll of paper that becomes top liner board 12. Top liner board 12 passes from top liner roll stand 10 toward and into pre-heater assembly 13. Pre-heater assembly 13 is a conventional wrap arm pre-heater assembly having a generally cylindrical heating drum supplied with steam from within the facility in which the corrugated board production line is situated. Pre-heater assembly 13 will also include a wrap arm, a motor to drive the wrap arm so that it travels in a circumferential direction about the cylindrical heating drum, and a limit switch and motor controller for controlling the movement of the wrap arm. As all of these components are conventional and known to those skilled in the art, they are not described in greater detail herein. Top liner board 12 is looped over the wrap arm of pre-heater assembly 13, so that at least a portion of top liner board 12 is in contact with at least a portion of the cylindrical heating drum of pre-heater assembly 13. Pre-heater assembly 13 may be controlled manually or automatically.

As is known to those skilled in the art, the wrap arm of pre-heater assembly 13 is moved to increase the amount of top liner board 12 in surface contact with a portion of the cylindrical heating drum to increase the temperature and thus lower the moisture content of the top liner board; and conversely, the wrap arm decreases the amount of wrap, that is the amount of top liner board 12 in surface contact with at least a portion of the cylindrical heating drum of pre-heater 13, in order to lower the temperature of the top liner board to thus increase the moisture content of the board. The manner in which a pre-heater assembly such as pre-heater assembly 13 disclosed herein operates is known to those skilled in the art.

Top liner board 12 next passes from pre-heater assembly 13 toward and into single facer 14. Single facer 14 includes a corrugator roll (not illustrated) and a glue station (not illustrated). A medium roll stand 15 supporting a medium or web board 16 also supplies paper to single facer 14, the medium board being passed through the corrugator roll to receive a corrugation imprint thereon, whereupon the tips of the corrugated web on one side of the medium board have glue (or starch) applied thereon so that top liner board 12 and the side of the web 16 to which glue has been applied are pressed together in single facer 14, and are then passed out of the single facer as single face web 18. As is known to those skilled in the art, the single face web may be of more than one type of corrugation, so that the corrugated medium, or web, can be known as a "B" or a "C" flute which generally describes the appearance of the web in the combined corrugated board.

Single face web 18 passes from single facer 14 over a web bridge 19 toward a triple wrap arm pre-heater assembly 20. Stationed underneath web bridge 19 is a bottom liner roll board stand 22 from which bottom liner board 23 passes toward and into triple pre-heater 20.

Triple pre-heater 20 contains three separate wrap arm pre-heater assemblies similar in structure and operation to that discussed above with regard to pre-heater assembly 13. Although pre-heater 20 is shown as being a triple pre-heater with three wrap arm heater assemblies, it is also known in the art that pre-heater assembly 20 may have only two wrap pre-heater arm assemblies supported therein.

Still referring to FIG. 1, triple pre-heater 20 contains a "B" flute wrap arm pre-heater assembly 25, a "C" flute wrap arm pre-heater assembly 29, and a bottom liner board wrap arm pre-heater assembly 33. "B" flute wrap arm pre-heater assembly 25 has a wrap arm 26, and a generally cylindrical heating drum 27. "C" flute wrap arm pre-heater assembly 29 has a wrap arm 30, and a generally cylindrical heating drum 31. Similarly, bottom liner board wrap arm pre-heater assembly 33 has a wrap arm 34, and a cylindrical heating drum 35.

In fashion similar to pre-heater assembly 13, "B" flute wrap arm pre-heater assembly 25, or "C" flute wrap arm pre-heater assembly 29, will have a portion of single face web 18 wrapped around at least a portion of heating drums 27 or 31, as the case may be. It is understood that although a separate "B" flute wrap arm pre-heater assembly and a "C" flute wrap arm pre-heater assembly are illustrated herein, the operation of both is otherwise identical.

Single face web 18 will be held by wrap arm 26 on heating drum 27 of "B" flute wrap arm pre-heater assembly 25. Wrap arm 26 will be moved to increase or decrease the amount of single face web 18 in surface contact with heating drum 27, thus increasing or decreasing the temperature, and in turn the moisture content, of the single face web as it proceeds toward glue station 37. In similar fashion, a portion of bottom liner board 23 will be wrapped around and in surface contact with a portion of heating drum 35 of bottom liner board wrap arm pre-heater assembly 33 by wrap arm 34. Single face web 18 and bottom liner board 23 then pass from the triple pre-heater to a glue station 37, in which glue is applied to the tips of the exposed corrugated web which forms single face web 18, so that the single face web will be glued to bottom liner board 23 forming combined board 38. Combined board 38 is an otherwise conventional corrugated board having a top liner board, a bottom liner board, and a corrugated web, or medium, glued to both of the liner boards to form the completed board.

Still referring to FIG. 1, single face web 18 and bottom liner board 20 pass from the glue station to a heating section 39 which is comprised of a plurality of heating plates (not illustrated) or rollers (not illustrated), and a belt which forces the single face web and bottom liner board together so that the glue, or starch, can adhere the single face web to the bottom liner board. Thereafter, the combined board passes to cooling section 41, and from there to shear 42 used to trim the combined board 38, if needed, and from shear 42 to slitter/scorer 43 which will slit and score the combined board 38 so that it can be formed into boxes or other corrugated board products.

As shown in FIG. 1, moisture control apparatus 5 includes a top liner board moisture sensor 45 and an opposed bottom liner board moisture sensor 46 which are stationed along corrugated board production line 7. Both moisture sensor 45 and moisture sensor 46 are stationed above and below combined board 38, respectively, in a fixed position with respect to the width of combined board 38, and in a position which is generally in the center of the width of the combined board. So positioned, moisture sensors 45 and 46 are situated to detect the machine direction, or lengthwise, moisture content variation within the top liner board and bottom liner board of the combined board 38. Unlike the apparatus of McGuire et al., and Krayenhagen et al., moisture sensors 45 and 46 of this invention are not moved transversely across the width of the corrugated board to determine cross machine moisture content in a plurality of transverse zones along the length of the board. Rather, due to the improved quality of paper manufactured by those manufacturers providing paper for use in manufacturing corrugated board, it is believed that only the detection of moisture content in the machine direction of the combined board is necessary in order to precisely control the warp of combined board 38 to provide a simple, efficient, and cost effective control apparatus for accomplishing the control of board warp.

Suitable moisture sensors for use as top liner board moisture sensor 45 and bottom liner board moisture sensor 46 are the model BSP-901-NIR moisture sensors manufactured by Moisture Register Products of La Verne, Calif. Similarly configured moisture sensors will suffice for the purposes of use with moisture control apparatus 5, however. Each of moisture sensors 45 and 46 is a near infrared single point moisture sensor, positioned along corrugated board production line 7 so as to read the moisture content in the top liner board and bottom liner board of the combined board. Moisture sensors 45 and 46 each generate an analog data signal proportional to the measured moisture content percentage of top liner board 12 and bottom liner board 23.

Unlike other moisture control systems known in the art, it is anticipated that by measuring the moisture content in the combined board at a position fixed along the production line where the board has been glued and processed, a more accurate measure of the actual moisture content within the board can be obtained for greater control of board warp resulting from the gluing and assembly of the combined board. It is also anticipated that by measuring the moisture content of the combined board that sophisticated algorithms and computer programs (software) will not be needed to predict what the resultant moisture content or warp of the board will be at a point further down the production line from the moisture sensors rather than actually measuring the moisture content of the combined board. Rather than predicting board warp, this system is predicated on measuring actual moisture content in the combined board, and then controlling board warp accordingly. By placing the moisture sensors between shear 42 and slitter/scorer 43, and generally at the centerline of combined board 38, the moisture sensors will monitor the moisture content of the top liner board and bottom liner board, respectively, in the combined board as it is manufactured and completed. Moisture sensors 45 and 46 are typically spaced at a distance of approximately 9 inches from the top and bottom surfaces of combined board 38, respectively.

Also shown in FIG. 1 is a line speed sensor 47 which is positioned along corrugated board production line 7 for the purposes of measuring the line speed of the corrugated board 38 as it moves along the production line. Although line speed sensor 47 is shown as being at the end of cooling section 41, it is anticipated that line speed sensor can be positioned anywhere along production line 7 to measure the corrugated board line speed, although it is preferred that line speed sensor measure the line speed of combined board 38, as opposed to the speed of top liner board 12, or bottom liner board 23.

Referring now to FIG. 2, moisture control apparatus 5 is shown in schematic block form. Moisture control apparatus 5 has an input-output panel 49 which is adapted to transmit and receive electronic data signals from central processing unit 50. Central processing unit 50 is an IBM compatible "PC" computer of sufficient memory and processing capacity to store the program data and process same for the purposes of automatically controlling the operation of wrap arm 26 of "B" flute wrap arm pre-heater assembly 25, wrap arm 30 of "C" flute wrap arm pre-heater assembly 29, and wrap arm 34 of bottom liner board wrap arm pre-heater assembly 33. Central processing unit 50 is a conventional personal computer understood by those skilled in the art to include a random access memory and/or a read only memory, a central processor or microprocessor chip, a hard disk drive, a floppy disk drive, and a data bus for receiving and communicating the data from moisture sensors 45 and 46, and from line speed sensor 47 to the processor, and for communicating the signals from the processor to the wrap arm pre-heater assemblies of triple pre-heater 20. Since central processing unit is otherwise conventional, its components and the operation thereof are not discussed nor illustrated herein in greater detail. Central processing unit 50 also includes a keyboard 51 for inputting data and for controlling the operation of the central processor, as well as a display monitor 52 for visually displaying program data, data inputs, and the status of system operations.

As shown in FIG. 2, and as schematically indicated in FIG. 1, input-output panel 49 will receive data from top liner moisture sensor 45, bottom liner moisture sensor 46, and line speed sensor 47. This data is received in analog form (see FIG. 7); converted into digital form and processed within central processing unit 50. Based upon the control method illustrated in FIG. 3, central processing unit 50 will process the data received from the moisture sensors and the line speed sensor, and will in turn transmit control signals to input-output panel 49, which will in turn forward control signals to either "B" flute pre-heater assembly wrap arm motor control 54 or "C" flute pre-heater assembly wrap arm motor control 55, depending on whether "B" flute or "C" flute corrugated board is being produced along production line 7. Input-output panel 49 will also transmit a signal to bottom liner board pre-heater assembly wrap arm motor control 56. As described in greater detail below, depending upon the data received and processed from moisture sensors 45 and 46, and line speed sensor 47, central processing unit 50 will signal either "B" flute wrap arm motor control 54 or "C" flute wrap arm motor control 55 to increase or decrease the amount of the single face web wrapped along the surface of either heating drums 27 or 31, as well as that portion of bottom liner board 23 in surface contact with heating drum 35, for the purposes of either increasing or decreasing the amount of liner board "wrapped" on the heating drum, thus increasing or decreasing, respectively, the moisture content of the single face web top liner board or the bottom liner board. Wrap arm motor controllers 54, 55, and 56 are otherwise conventional motor controllers, as it is known in the art to control the movement of the wrap arms of wrap arm pre-heater assemblies used in corrugated board production lines. Accordingly, the wrap arm motor controls are not described in greater detail herein.

Figure 5:
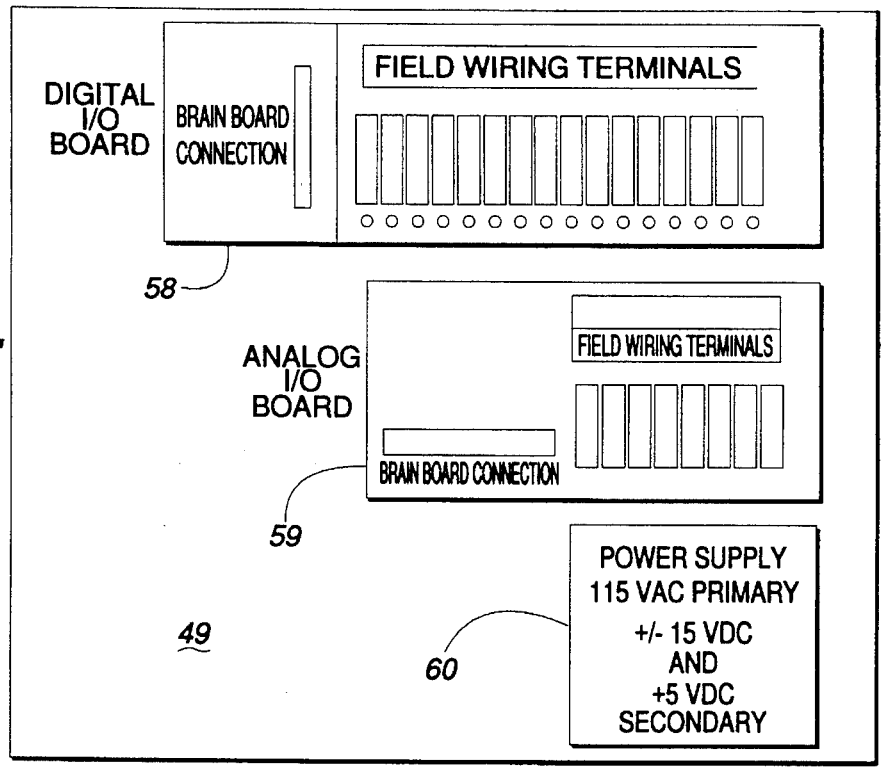
FIG. 5 is a schematic diagram of the input-output board of the apparatus of FIG. 2.
Figure 6:
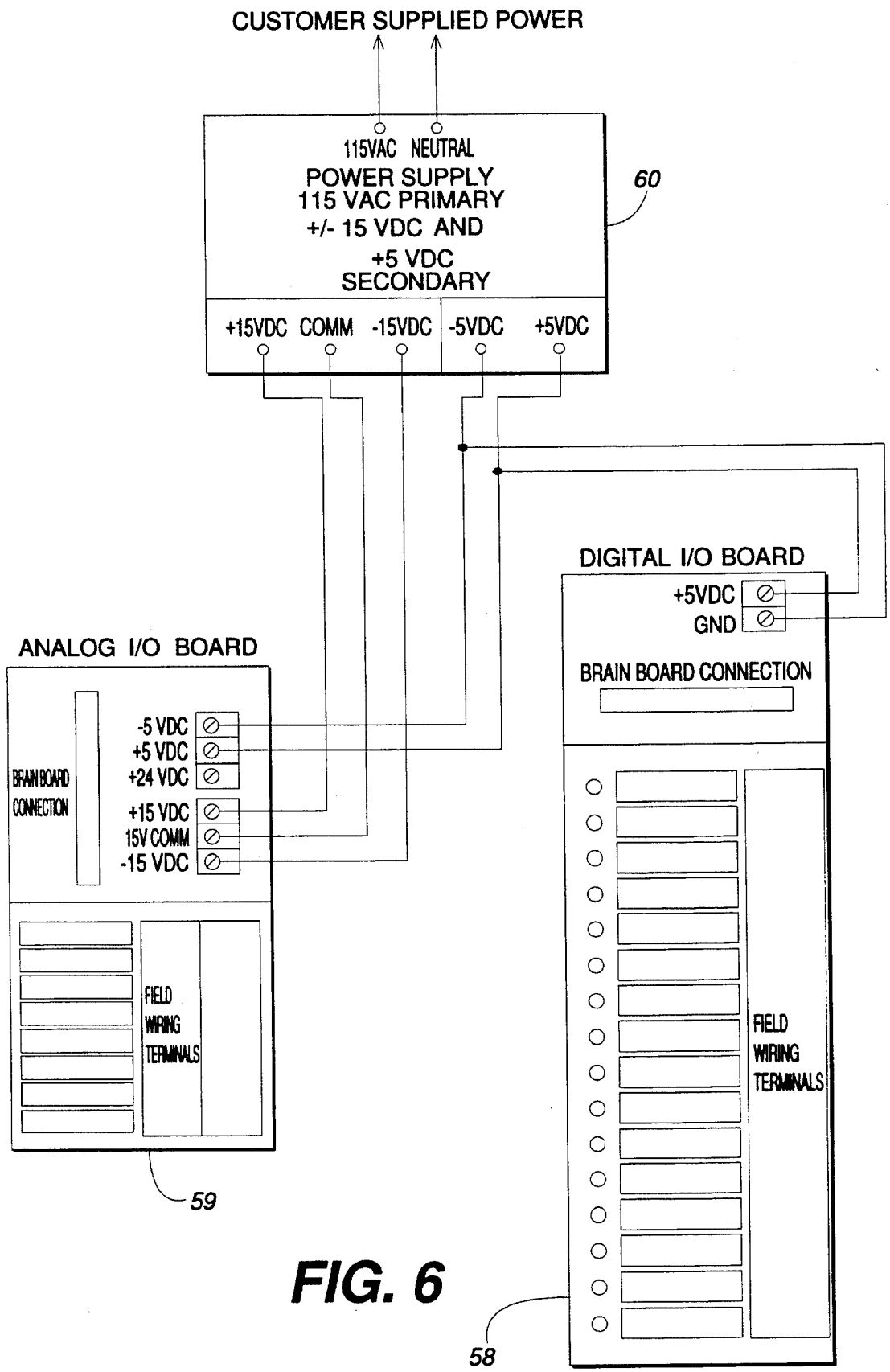
FIG. 6 is a more detailed schematic illustration of the input-output board of FIG. 5.

Referring now to FIG. 5, input-output panel 49 is illustrated in schematic form. Input-output panel 49 has a digital input-output board 58, an analog input-output board 59, and a power supply 60. A schematic wiring diagram of input-output panel 49, and its components, is illustrated in FIG. 6.

Figure 7:
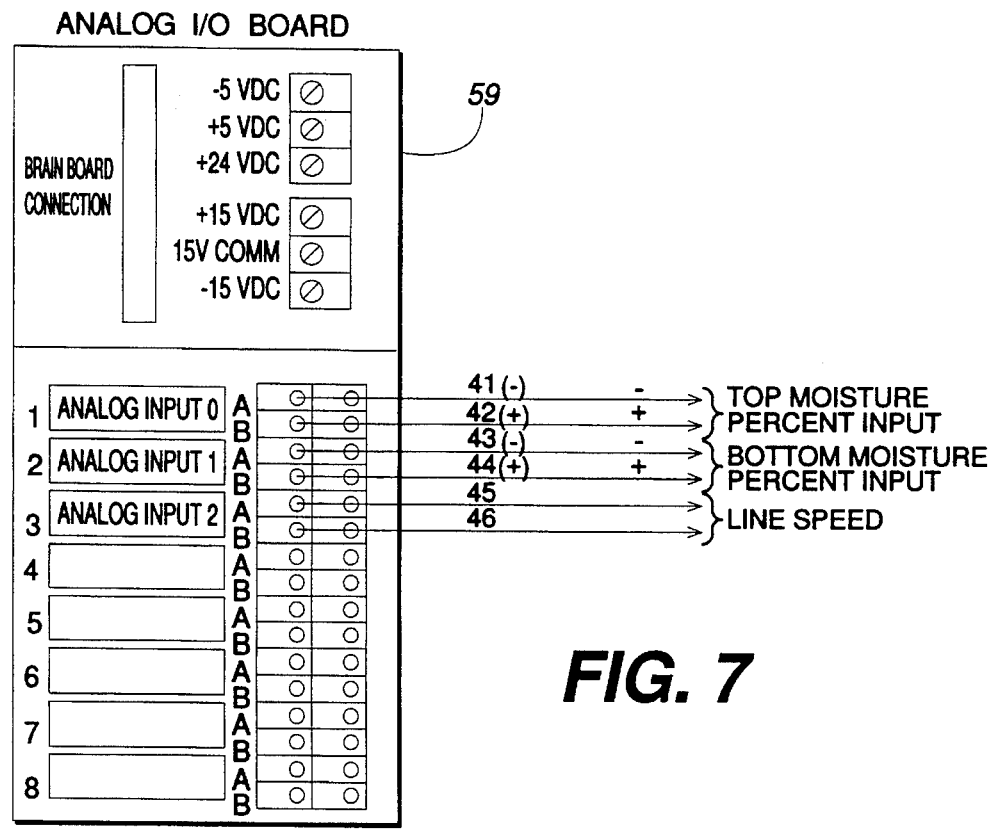
FIG. 7 is a detailed schematic illustration of the analog input-output board shown in FIG. 5.

As shown in FIG. 7, analog input-output board 58 receives three analog input signals identified as analog inputs 0, 1, and 2. Analog input 0 will receive an analog data signal from top liner moisture sensor 45 which represents the measured moisture content of top liner board 12. Similarly, analog input 1 will receive an analog data signal from bottom liner moisture sensor 46 which represents the measured moisture content of bottom liner board 23. Analog input 2 will receive an analog line speed signal from line speed sensor 47 equal to the speed of corrugated board production line 7. The analog signals received from moisture sensors 45 and 46, and line speed sensor 47, are converted into digital signals and transmitted from analog input-output board 59 to input-output board 49, and from there to central processing unit 50 for processing. Once processed, as described in greater detail below, central processing unit 50 then transmits any one or combination of seven digital signals to digital input-output board 58, the digital signals being sent to either "B" flute wrap arm motor control 54 or "C" flute wrap arm motor control 55, as well as to bottom liner board wrap motor control 56.

Figure 8:
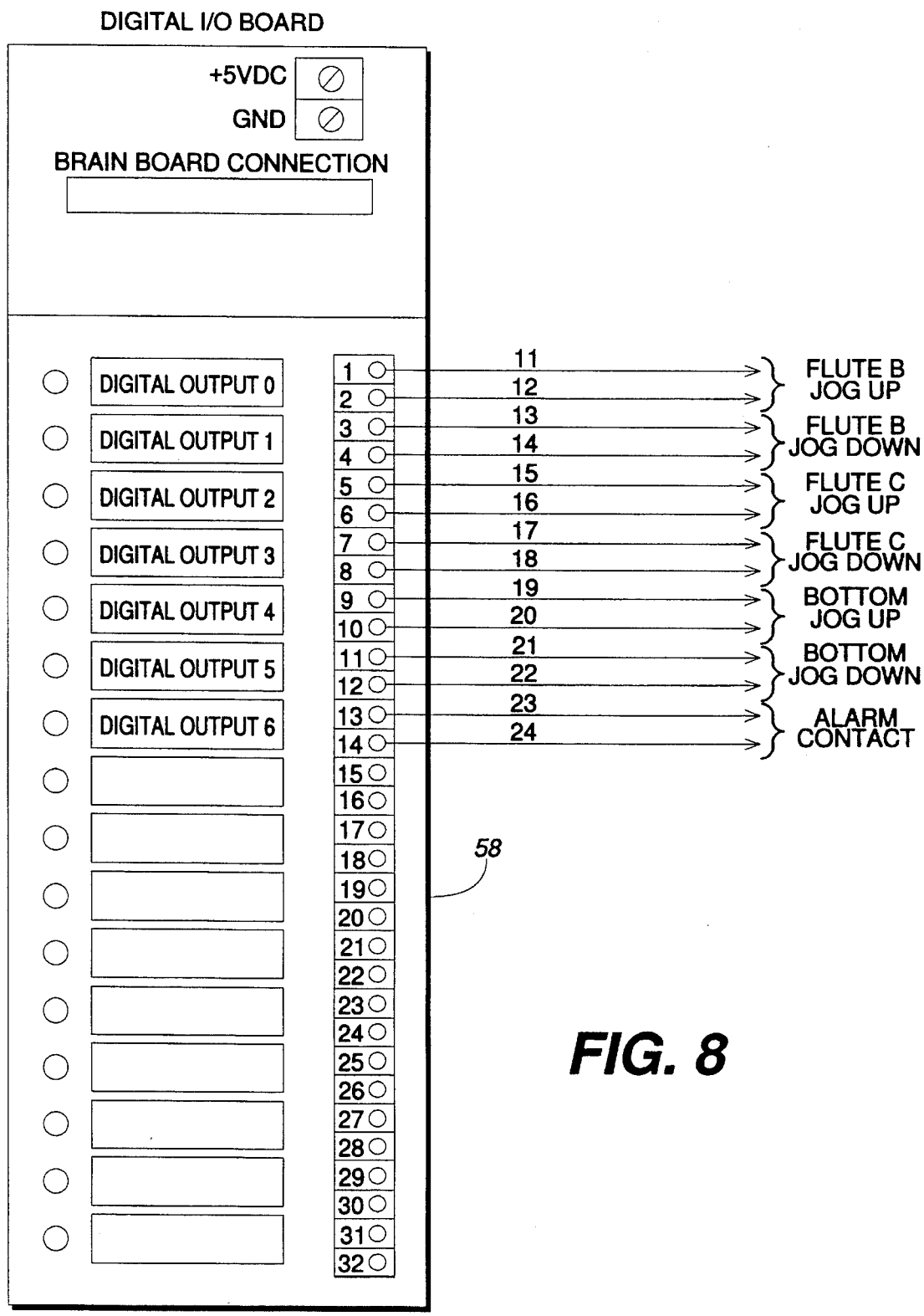
FIG. 8 is a detailed schematic illustration of the digital input-output board shown in FIG. 5.

Referring now to FIG. 8, the seven digital output signals are represented as digital outputs 0, 1, 2, 3, 4, 5, and 6. Digital outputs 0 and 1 will provide a signal to jog or move wrap arm 26 of "B" flute wrap arm pre-heater assembly 25 up or down to increase or decrease the amount of top liner board 12 wrap around heating drum 27. In similar fashion, if "C" flute is being manufactured along corrugated board production line 7, digital outputs 2 and 3 will be utilized to signal wrap arm 30 of "C" flute wrap arm pre-heater assembly 29 to jog, or move, the wrap arm up or down for the purposes of increasing or decreasing the amount of wrap of bottom liner board 23 around heating drum 31. Digital outputs 4 and 5 will signal wrap arm 34 of bottom liner board wrap arm pre-heater assembly 33 for either increasing or decreasing the amount of bottom liner board wrap 23 around a portion of heating drum 35.

Although not shown in FIG. 2, moisture control apparatus 5 can include an audible or visual alarm (not illustrated) for signaling whether attention is required to the moisture control system. This is represented by digital output 6, which may be provided, if so desired, to signal the alarm.

Figure 9:
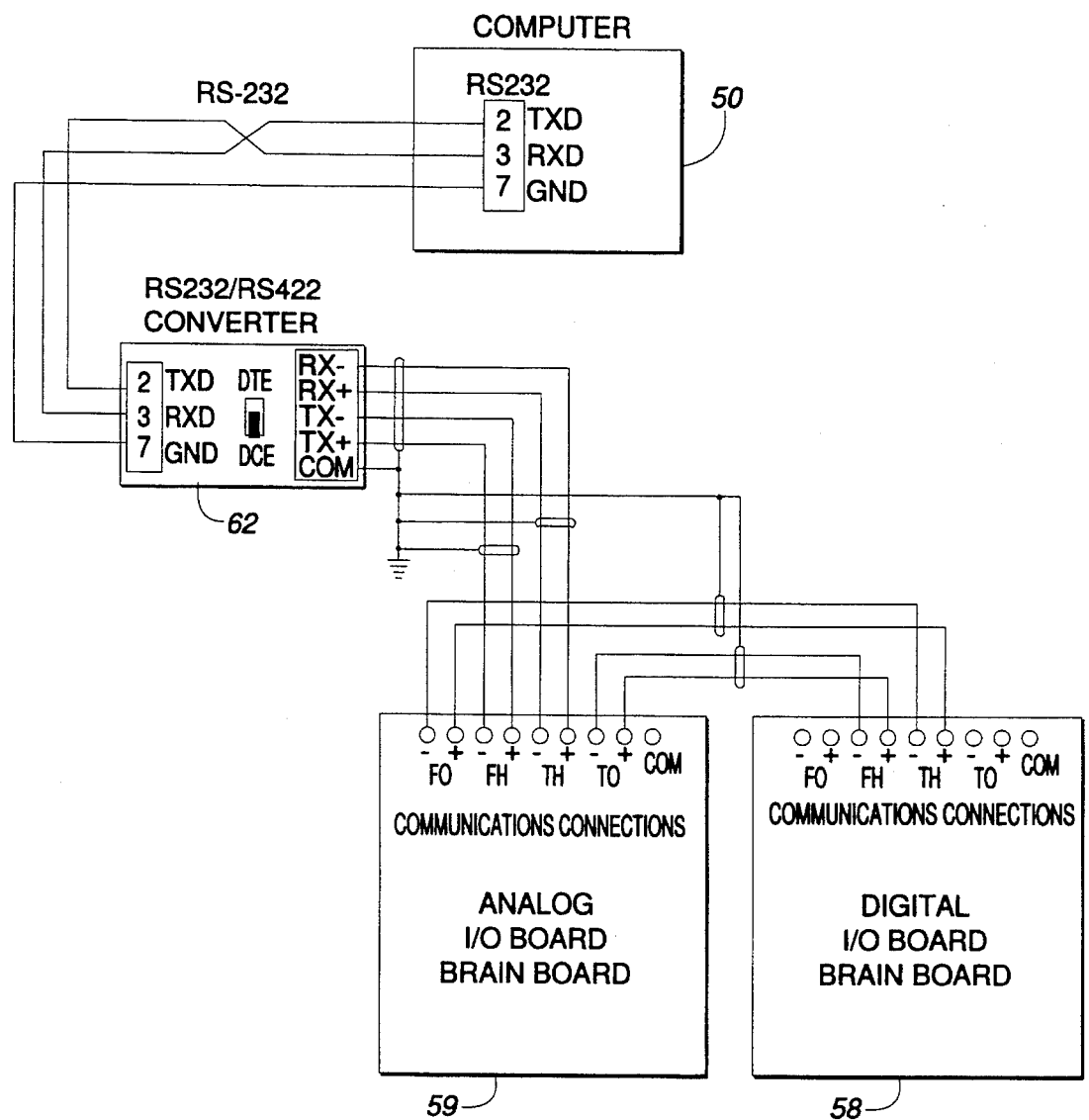
FIG. 9 is a schematic wiring diagram illustrating the connection of the input-output board of FIG. 5 to the central processor of the apparatus illustrated in FIG. 2.

FIG. 9 schematically illustrates the electrical wiring used to transmit the converted analog to digital signals of analog input-output board 59 to central processing unit 50, and to transmit the digital signals from the central processing unit to digital input-output board 58, through the use of an RS 232/RS 422 converter, model 222 N provided by Patton Electronics. Input-output panel 49, used within moisture control apparatus 5, contains components manufactured by Opto-22 of Temecula, Calif.

OPERATION

Figure 3:
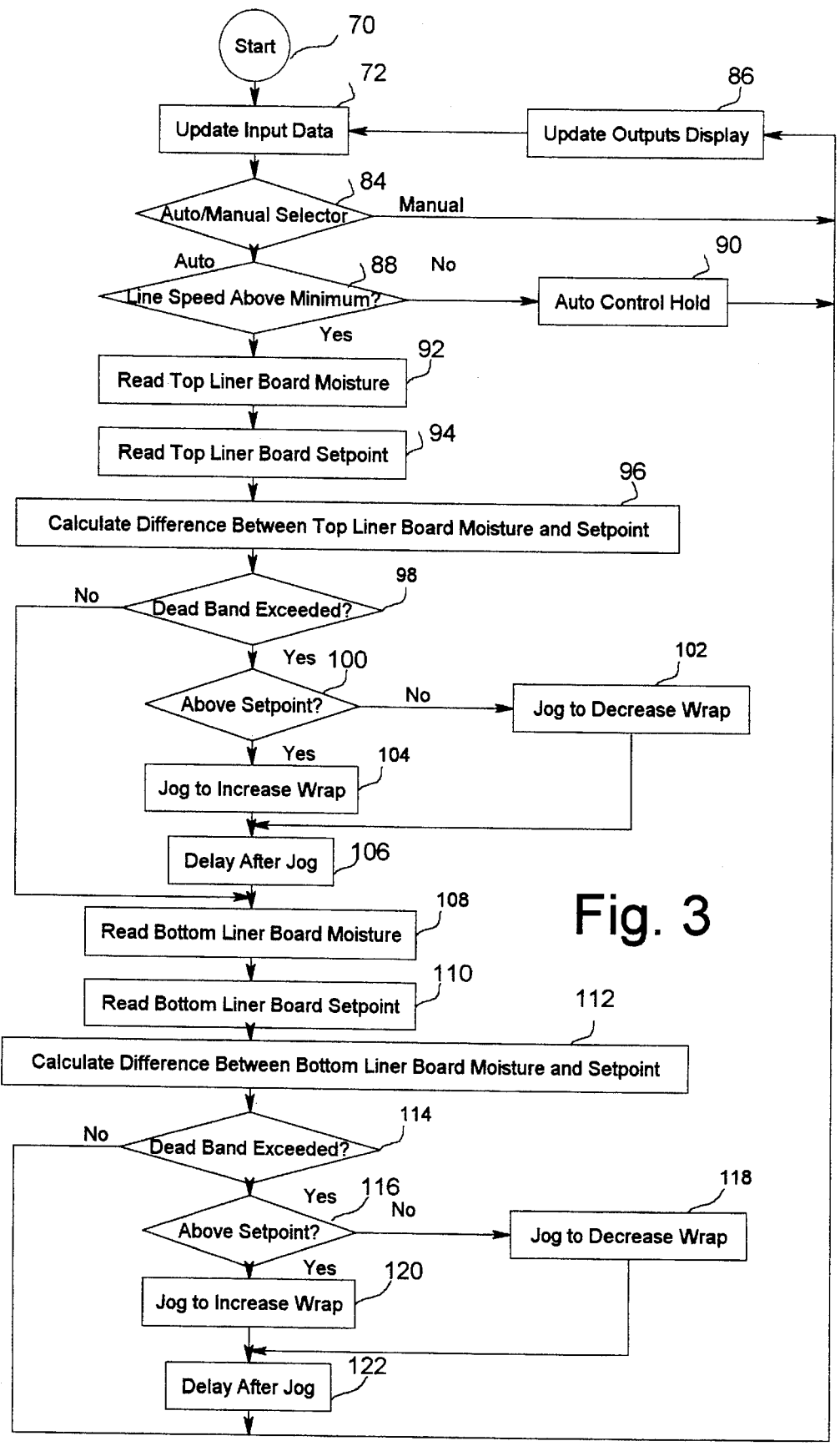
FIG. 3 is a flow chart of the automatic control process of this invention.

Referring now to FIG. 3, a flow chart illustrating the program routine stored within the memory of, and executed by central processing unit 50 of moisture control apparatus 5 is illustrated. The software code which performs the routine illustrated in FIG. 3 is included hereinbelow as Table 1.

The control process starts at step 70, in which moisture control apparatus 5 is turned on. After being turned on, the program executes step 72, in which the initial, or updated, input data for the program is entered into or read out of the memory (not illustrated) of central processing unit 50. This is shown in greater detail in FIG. 4.

Figure 4:
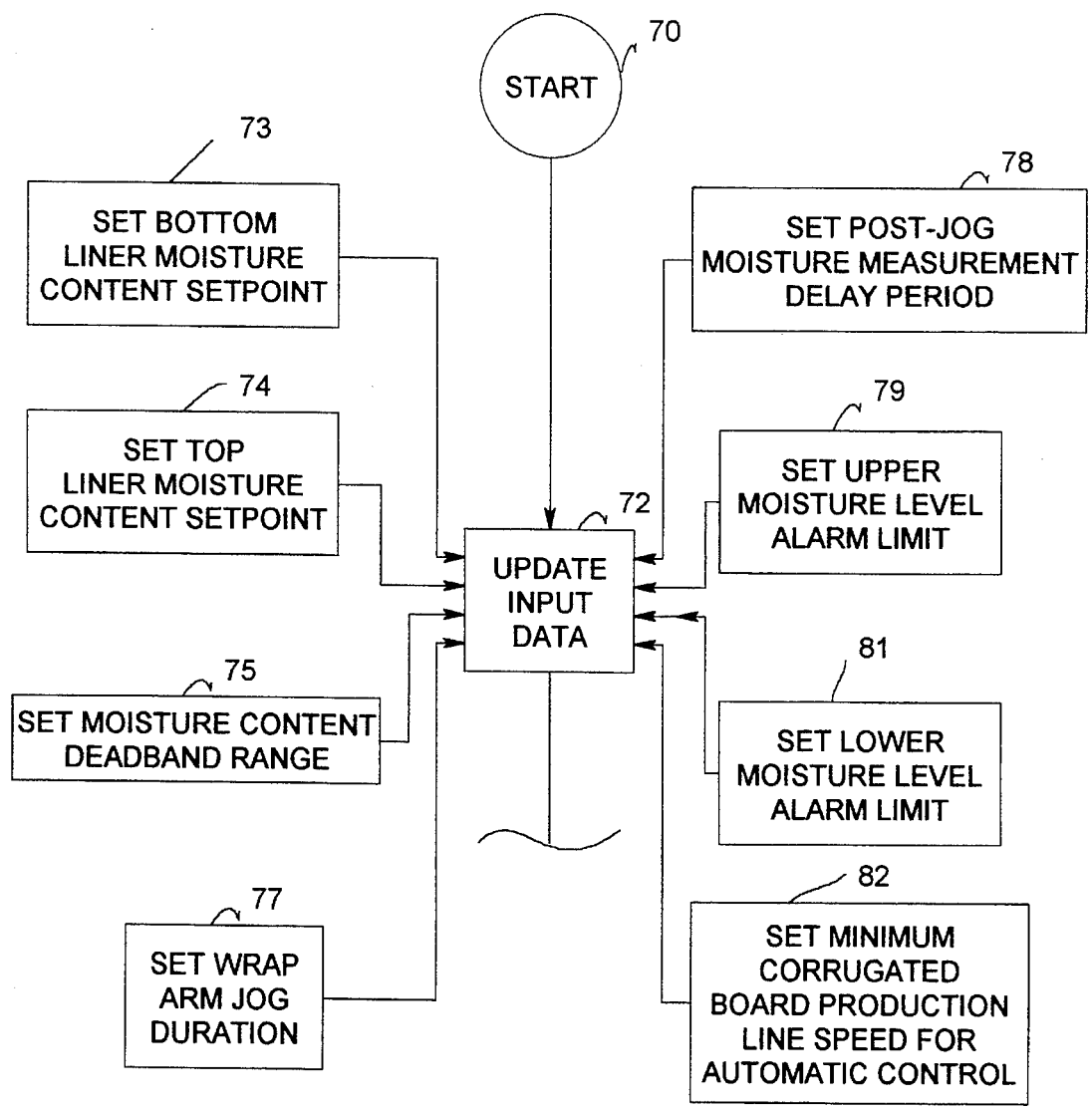
FIG. 4 is a block diagram of the initial control input data for the automatic control process of FIG. 3.

As shown in FIG. 4, the data input into central processing unit 50 in step 72 includes step 73 of setting the bottom liner board moisture content setpoint, step 74 of setting the top liner board moisture content setpoint, step 75 of setting the moisture content deadband range, step 77 of setting the wrap arm jog (movement) duration time period for wrap arms 26, 30, and 34, step 78 of setting the post jog moisture measurement delay time period, step 79 of setting the upper moisture level alarm limit, step 81 of setting the lower moisture level alarm limit, and step 82 of setting the minimum corrugation board production line speed necessary for automatic control of moisture control apparatus 5.

In step 73, a bottom liner moisture content setpoint is established in which the moisture content percentage desired in the bottom liner board is input into central processing unit 50. The software performing the steps of FIG. 3, will seek to control the bottom liner board moisture to match the setpoint. The setpoint value must be chosen so that the combined board 38 will retain enough moisture therein to be scored and converted without cracking. All that is necessary in controlling the moisture of combined board 38 is to equalize the moisture in top liner board 12 and bottom liner board 23 within acceptable limits, so that one side will not warp toward the other.

Similarly, step 74 includes inputting the top liner moisture content setpoint in fashion similar to that of step 73. This establishes the target moisture content level in top liner board 12. In step 75, the moisture content deadband range for both the top liner board and bottom liner board is input into central processing unit 50. The actual liner board moisture, as measured by either moisture sensor 45 or moisture sensor 46, must exceed the setpoint by this amount before the moisture control apparatus 5 will transmit a signal to wrap arm pre-heater assemblies 25, or 29, and/or 33. The deadband moisture content percentage will typically be in the range from 0.2 to 0.5%.

In step 77 the wrap arm jog duration time period is set, which is equal to the length of time, in seconds, that moisture control apparatus 5 will signal the movement of wrap arms 26, 30, and/or 34 to position the amount of wrap for single face web 18 on either the "B" or "C" flute wrap arm pre-heater assemblies, or position the amount of wrap for bottom liner board 23 on bottom liner board wrap arm pre-heater assembly 33, in order to drive the liner board moisture to the setpoint and within the deadband. The jog duration time period is anticipated to be equal to the time required for the wrap arms to move through a ⅛ to ¼ circumference wrap along the surface of heating drums 27, 31, and/or 35. In step 78, the moisture measurement delay period after jog is input into central processing unit 50. The post jog moisture measurement delay period represents the amount of time required for the liner to travel from the wrap arms to the moisture sensor location so that after the wrap arms make a position change adequate time is allowed for the moisture sensor to detect the new moisture level before initiating another correction, as represented by the steps of flow chart in FIG. 3. The time period set in step 78 is a function of both the distance between the wrap arms and the moisture sensors of the control apparatus, and the line speed of the production line.

In steps 79 and 81, an upper moisture level alarm limit and lower moisture alarm limit are input into the central processor, so that if either the maximum or minimum desired moisture content percentage in either the top or bottom liner boards is exceeded, an alarm will be signaled to give an audible, or if desired visual, notice of the alarm condition. It is anticipated that this alarm can be signaled electronically from central processing unit 50 to display monitor 52, so that the corrugated production line system operator will be notified of the moisture content variance beyond acceptable ranges.

The last data entered into central processing unit 50 in step 72 is step 82, wherein the minimum corrugation board production line speed necessary for automatic control of moisture control apparatus 5 is established. The necessary minimum line speed is operator adjustable.

Turning now to FIG. 3, after step 72 has been executed, as described above, the program executes step 84, in which the production line operator can select manual control of wrap arms 26, 30, and 34, or automatic control of the wrap arms through moisture control apparatus 5. If the operator chooses manual operation of the wrap arms, the program will loop to step 86 where it will update the output display on display monitor 52, and will loop to step 72 whereupon the input data is again verified or updated, and then loop back again to step 84 where the auto manual selection is made. If the operator has chosen automatic selection of the system, the program executes step 88, wherein it tests whether the line speed of the corrugated production line exceeds the minimum line speed set in step 82. If the minimum line speed is not exceeded, the program will loop to step 90, placing the system in automatic control hold in which the system will not be automatically operated, and then loop back to steps 86 and 72 to continue the program. If the minimum line speed established in step 82 is exceeded, the program will execute step 92, whereupon the top liner board moisture will be read by moisture sensor 45.

The program then executes step 94, in which the top liner board moisture content setpoint input in step 74 is read out of the central processing unit's memory, the program then proceeding to step 96 wherein the difference between the top liner board moisture content and the setpoint is calculated resulting in a number which represents the moisture content percentage of the top liner board. The program then proceeds to step 98 whereupon the number resulting from step 96 is compared against the deadband moisture content range input in step 75. If the number calculated in step 96 falls within the deadband moisture content range, the program will proceed to step 108. If, however, the number calculated by step 96 falls outside of the deadband moisture content range, the program then proceeds to step 100 to determine whether the number calculated in step 96 represents a moisture content level above or below the top liner board moisture content setpoint. If the number from step 96 is below the setpoint of step 74, the moisture content of top liner board is too low, therefore the program executes step 102 in which either of wrap arms 26 or 30 is jogged to decrease the amount of top liner board wrap on either of heating drums 27 or 31, thus lowering the temperature, and increasing the moisture content percentage of the top liner board. After performing step 102, the program will execute step 106. If, however, the number calculated in step 96 is above the top liner board moisture content setpoint, central processing unit 50 will signal either of wrap arms 26 or 30 to increase the amount of top liner board wrap on either heating drums 27 or 31, respectively, to increase the temperature, and thus decrease the moisture content of the top liner board. The program will then execute step 106.

In step 106, the post jog moisture measurement delay period input in step 78 is read out of memory to delay any further system response to the data transmitted by top liner board moisture sensor 45 for this prescribed period of time so that the adjustment made by the wrap arms of either the "B" flute or "C" flute wrap arm pre-heater assemblies is made, and the adjusted moisture content given sufficient time to proceed down along corrugated board production line 7 to the point where moisture sensor 45 is positioned. Once this has been accomplished, the program will execute step 108, wherein the bottom liner board moisture content is measured by bottom line moisture sensor 46. The program will then proceed to step 110, wherein the bottom liner board moisture content setpoint is read out of memory, then program then executing step 112 wherein the difference between the bottom liner board moisture content and the setpoint for the bottom liner board is calculated.

Thereafter, in fashion similar to the steps performed for the top liner board, the difference calculated in step 112 is tested to see if it falls within the deadband moisture content range input in step 75. If the deadband is satisfied, the program will jump to step 86, wherein the program will update the output display on display monitor 52, and then proceed with executing step 72 and perform the control program once again.

If, however, the deadband moisture content range is not satisfied in step 114, the program will execute step 116, in which it is determined whether the number calculated in step 112 exceeds or is below the setpoint input in step 73. If the calculated number is below the bottom liner setpoint, the program executes step 118, wherein central processing unit 50 signals a jog to wrap arm 34 to decrease the amount of bottom liner board wrapped around heating drum 35 decreasing the temperature of the bottom liner board and thus increasing its moisture content. If, however, the number calculated in step 112 is determined in step 116 to be above the setpoint of step 73, central processing unit 50 will signal wrap arm 34 in step 120 to increase the amount of bottom liner board wrap in surface contact with heating drum 35 to increase the temperature of the bottom liner board, and thus decrease the moisture content of the board. Thereafter, the program will execute step 122, in which the post jog moisture measurement delay period input in step 78 is read out of memory and is used to delay any further system response to the data from bottom moisture sensor 46 for a specific period of time to allow the adjusted bottom liner board to pass from the pre-heater assembly to bottom liner moisture sensor 46, whereupon the data signal from bottom liner board moisture sensor 46 will be processed, the program continuing to step 86, wherein the output display on display monitor 52 will be updated, the program then looping back on itself in step 72 to verify the input data, which will read any new input data or verify the existing set-up data, whereupon the program will continued execution as described above.

Thus, the control method detailed in FIG. 3 illustrates that the automatic control methodology of moisture control apparatus 5 continuously monitors the actual moisture content percentage in both the top liner board and bottom liner board, separately, processes these values separately against separate moisture content setpoints, and compares this data to a deadband range shared by both the top liner board and bottom liner board, to then signal the wrap arms of either the "B" or "C" wrap flute wrap arm pre-heater assemblies or the wrap arm of the bottom liner board wrap arm pre-heater assembly in order to control the moisture content of the top and bottom liner boards to fall within the programmed deadband moisture content range. Thus, rather than averaging the moisture content of both the top liner board and bottom liner board together, and controlling the system accordingly, a unique feature of this system is that it allows separate adjustment of the moisture content percentages of the top liner board and bottom liner board independently of one another to accommodate the different rolls of liner board used for each, and to accommodate differences which will arise within spliced rolls used for the top liner board and bottom liner board in the production line.

While a preferred embodiment of the invention has been disclosed in the foregoing specification, it is understood by those skilled in the art that variations and modifications thereof can be made without departing from the spirit and scope of the invention, as set forth in the following claims.

TABLE I

```
CORR-TROL Control Seament Source Code
(c) Copyright 1995
    void data_update0
    {
    long temp_long;
#ifdef ONLINE
        if (opto_data[10]&bmask[15])
            manual_adjust =1;
        top_moisture = opto_data[1]/27;
        bot_moisture = opto-data[2]/27;
        avg_moisture = (top_moisture + bot_moisture)/2;
        temp_long = ((long)opto_data[3]*
(long)tach_calibrate_value)/
10000L;
        If (temp_long < = 0)
        {
          line-speed = 0;
        }
        else
        {
          line_speed = (int)temp_long;
        }
#endif
    }
    void control_service0
    {
    Int l;
    Int jog_bits:
        If (line_speed <min_auto_speed)
        {
        autohold = 1;
        }
        If (line_speed >=
        min_auto_speed && lmanuall_adjust)
        {
          autohold = 0;
        }
        If (automan && llast_automan)
        {
          jog_delay_elapsed = jogdelay;
        }
        last automan = automan;
        If(manual_adjust && llast_manual_adjust)
        {
          man_adj_elapsed = jog_delay
          autohold = 1;
        }
        last_manual_adjust = manual_adjust;
        If((manual_adjust && --man_adj_elapsed<=
        0)ll(autostpt))
        }
        bottom_sp=bot_moisture;
        top_sp=top-moisture;
        manual_adjust = 0;
        autostpt = 0;
        autohold = 0;
    }
    If (automan && lautohold)
    }
    If (-jog_delay_elapsed<=0)
    }
        jog_blts = 0;
        If (abs(bottom_sp - bot_moisture)>sp_deadband)
        {
         If (bottom_sp>bot_moisture)
         }
          jog_bits = jog_bits IBOTTOM_JOG_DOWN;
         }
         else
         {
          jog_blts = jog_blts IBOTTOM_JOG_UP;
         }
        }
        If (abs(top_sp - top_moisture)>sp_deadband)
        {
         if (!flute)
```

TABLE I-continued

```
{
  if(top_sp>top_moisture)
  {
    jog_bits=jog_bits IB_FLUTE_JOG_DOWN;
  }
  else
  {
    jog_bits=jog_bits|B_FLUTE_JOG_UP;
  }
}
else
{
  If (top_sp>top_moisture)
  {
    Jog_bits=jog_bits|C_FLUTE_JOG_DOWN;
  }
  else
  {
    jog_blts=jog_bits |C_FLUTE_JOG_UP;
  }
}
}
jog_delay_elapsed=jog_delay;
opto_data[O]=jog_blts; /*set value to start jog pulse */
}
else
{
opto_data[0]=0; /*next scan clear jog pulse start */
}
opto_data[23]=jog_bits;
}
else
{
  opto_data[O]=0; /*in manual clamp off jog pulse start */
}
If(upper_air||lower_air)
{
opto_data[30]=0x40;
opto_data[31]=0;
}
else
{
opto_data[30]=0;
opto_data[31]=0x40;
}
opto_data[20]=jog_duration;
opto_data[21]=jog_delay_elapsed;
opto_data[22]=automan;
}
```

I claim:

1. A method of automatically controlling the moisture content of corrugated board manufactured in a corrugated board production line, the corrugated board having a top liner board, a fluted web medium glued to the top liner board forming a single face web, and a bottom liner board, the bottom liner board being glued to the fluted medium of the single face web thus forming the corrugated board, where at least a portion of the single face web top liner board is held by a wrap arm in surface contact with at least a portion of the cylindrical heating drum of a first wrap arm pre-heater assembly for varying the moisture content of the top liner board, and at least a portion of the bottom liner board is held by a wrap arm in surface contact with at least a portion of the cylindrical heating drum of a second wrap arm pre-heater assembly for varying the moisture content of the bottom liner board, comprising the steps of:

measuring the moisture content of the top liner board along the corrugated board production line;

calculating the difference between the measured moisture content of the top liner board and a first moisture content setpoint;

measuring the moisture content of the bottom liner board along the corrugated board production line;

calculating the difference between the measured moisture content of the bottom liner board and a second moisture content setpoint;

signaling the first wrap arm pre-heater assembly if the difference in the moisture content between said first setpoint and the top liner board falls outside of a deadband moisture content range; and signaling the second wrap arm pre-heater assembly if the difference in the moisture content between said second setpoint and the bottom liner board falls outside of said deadband.

2. The method of claim 1, comprising the additional step of moving the first wrap arm and second wrap arm, respectively, in response to said signals so that the moisture content of the top liner board and of the bottom liner board is controlled to fall within said deadband.

3. A method of automatically controlling the moisture content of corrugated board manufactured in a corrugated board production line, the corrugated board having a top liner board, a fluted web medium glued to one side of the top liner board forming a single face web, and a bottom liner board glued to the fluted medium of the single face web thus forming the combined corrugated board, where at least a portion of the single face web top liner board is held by a wrap arm in surface contact with at least a portion of the cylindrical heating drum of a first wrap arm pre-heater assembly for varying the moisture content thereof, and at least a portion of the bottom liner board is help by a wrap arm in surface contact with at least a portion of the cylindrical heating drum of a second wrap arm pre-heater assembly for varying the moisture content thereof, comprising the steps of:

measuring the moisture content of the top liner board in a fixed position along the corrugated board production line;

calculating the difference between the measured moisture content of the top liner board against a first moisture content setpoint;

determining whether the calculated moisture content difference for the top liner board falls outside of a deadband moisture content range;

moving the wrap arm of the first wrap arm pre-heater assembly to increase or decrease the amount of single face web top liner board in surface contact with the heating drum thereof in response to the presence of a difference in the moisture content between the top liner board and said first setpoint outside of said deadband;

measuring the moisture content of the bottom liner board in a fixed position along the corrugated board production line;

calculating the difference between the measured moisture content of the bottom liner board against a second moisture content setpoint;

determining whether the calculated moisture content difference for the bottom liner board falls outside of said deadband; and moving the wrap arm of the second wrap arm pre-heater assembly to increase or decrease the amount of bottom liner board in surface contact with the heating drum thereof in response to the presence of a difference in the moisture content between the bottom liner board and said second setpoint outside of said deadband.

4. The method of claim 3, further comprising the step of measuring the moisture content of the top liner board of the combined corrugated board along the corrugated board production line in a position fixed with respect to the width of the corrugated board.

5. The method of claim 3, further comprising the step of measuring the moisture content of the bottom liner board of the combined corrugated board along the corrugated board production line in a position fixed with respect to the width of the corrugated board.

6. The method of claim 3, further comprising the steps of measuring the speed of the corrugated board production line, comparing the speed thereof to a minimum production line speed, and automatically controlling the moisture content of the corrugated board if the speed of the production line is greater than or equal to said minimum line speed.

7. The method of claim 6, comprising the step of suspending the automatic control of the moisture content of the corrugated board if the production line speed falls below said minimum line speed.

8. The method of claim 6, comprising the additional step of inputting said first setpoint, said second setpoint, said deadband, and said minimum line speed in a processing means.

9. The method of claim 8, further comprising the step of inputting a wrap arm jog duration time period in said processing means for establishing the amount of time during which the wrap arm of the first wrap arm pre-heater assembly, and the wrap arm of the second wrap arm pre-heater assembly, respectively, will move to increase or decrease the amount of single face web top liner board and bottom liner board in wrapped surface contact on the cylindrical heating drums of the pre-heater assemblies, respectively.

10. The method of claim 3, further comprising the step of delaying the measurement of the moisture content of the top liner board in response to the movement of the wrap arm of the first wrap arm pre-heater assembly.

11. The method of claim 3, further comprising the step of delaying the measurement of the moisture content of the bottom liner board in response to the movement of the wrap arm of the second wrap arm pre-heater assembly.

12. The method of claim 3, comprising the additional step of displaying the measured moisture content of the top liner board and of the bottom liner board, said first setpoint, said second setpoint, and said deadband on a system display monitor.

13. An apparatus for automatically controlling the moisture content of a corrugated board manufactured in a corrugated board production line, the corrugated board having a top liner board, a fluted web medium glued to one side of the top liner board forming a single face web, and a bottom liner board, the corrugated board production line having a pre-heater in which a first wrap arm pre-heater assembly and a second wrap arm heater assembly are both supported, in which at least a portion of the single face web top liner board is held by a wrap arm in surface contact with at least a portion of the cylindrical heating drum of the first wrap arm pre-heater assembly for varying the moisture content thereof, and at least a portion of the bottom liner board is held by a wrap arm in surface contact with at least a portion of the cylindrical heating drum of the second wrap arm pre-heater assembly for varying the moisture content thereof, comprising:

means for measuring the moisture content of the top liner board along the corrugated board production line;

means for measuring the moisture content of the bottom liner board along the corrugated board production line;

means for processing the measured moisture content readings obtained from said means for sensing the moisture content of the top liner board and of the bottom liner board, said processing means including, a first moisture content setpoint for the top liner board,
a second moisture content setpoint for the bottom liner board,
a deadband moisture content range for both the top liner board and the bottom liner board,
wherein said processing means calculates whether a difference exists between said first setpoint and the measured moisture content of the top liner board
and between said second setpoint and the measured moisture content of the bottom liner board, and if so, said processing means then determines whether the differences fall outside of said deadband; and signal generating means for generating a signal to move the wrap arm of the first wrap arm pre-heater assembly in response thereto for increasing or decreasing the amount of the single face web top liner board in surface contact with the first pre-heater assembly, and for generating a signal to move the wrap arm of the second wrap arm pre-heater assembly in response thereto for increasing or decreasing the amount of the bottom liner board in surface contact with the second pre-heater assembly.

14. An apparatus for automatically controlling the moisture content of corrugated board manufactured in a corrugated board production line, the corrugated board having a top liner board, a fluted web medium glued to one side of the top liner board forming a single face web, and a bottom liner board having one side thereof glued to the fluted medium of the single face web thus forming the combined corrugated board, the corrugated board production line having a pre-heater in which a first wrap arm pre-heater assembly and a second wrap arm pre-heater assembly are both supported, in which a portion of the single face web top liner board is held by a wrap arm in surface contact with at least a portion of the cylindrical heating drum of the first wrap arm pre-heater assembly for varying the moisture content of the top liner board, and a portion of the bottom liner board is held by a wrap arm in surface contact with at least a portion of the cylindrical heating drum of the second wrap arm pre-heater assembly for varying the moisture content of the bottom liner board, a shear for the combined corrugated board positioned downstream of the pre-heater, and a slitter/scorer positioned downstream of the shear, comprising:

means for measuring the moisture content of the top liner board in a fixed position along the corrugated board production line;

means for measuring the moisture content of the bottom liner board in a fixed position along the corrugated board production line;

means for determining whether a difference exists between the measured moisture content of the top liner board and a first moisture content setpoint, and for determining whether a difference exists between the measured moisture content of the bottom liner board and a second moisture content setpoint;

means for generating a signal to the wrap arm of the first pre-heater assembly if the difference in the measured moisture content between the top liner board and said first setpoint falls outside of a deadband moisture content range; and means for generating a signal to the wrap arm of the second pre-heater assembly if the difference in the moisture content between the bottom liner board and said second setpoint falls outside of said deadband.

15. The apparatus of claim 14, comprising means for moving the wrap arms of the first and second pre-heater assemblies, respectively, in response to said signals so that the moisture content of the top liner board and of the bottom liner board is controlled to fall within said deadband.

16. The apparatus of claim 15, wherein said means for measuring the moisture content of the top liner board and of the bottom liner board are positioned downstream of the pre-heater and along that portion of the corrugated board production line where the single face web and bottom liner board have been glued together to form the combined corrugated board.

17. The apparatus of claim 15, wherein said means for measuring the moisture content of the top liner board is stationed in a fixed position above, and with respect to the width of, the combined corrugated board between the shear and the slither/scorer of the corrugated board production line.

18. The apparatus of claim 15, wherein said means for measuring the moisture content of the bottom liner board is stationed in a fixed position below, and with respect to the width of, the combined corrugated board between the shear and the slither/scorer of the corrugated board production line.

19. The apparatus of claim 15, wherein said means for determining whether a difference exists between the measured moisture content of the top liner board and said first moisture content setpoint, and for determining whether a difference exists between the measured moisture content of the bottom liner board and said second moisture content setpoint comprises a processing means.

20. The apparatus of claim 19, wherein said first setpoint, said second setpoint, and said deadband are input into and stored within said processing means prior to automatic operation of the apparatus.

21. The apparatus of claim 20, wherein a jog time period is input into and stored within said processing means, wherein processing means then controls the amount of time during which the wrap arm of the first wrap arm pre-heater assembly and the wrap arm of the second wrap arm pre-heater assembly are moved in response to said signals.

22. The apparatus of claim 20, further comprising means for measuring the speed of the corrugated board production line, wherein said processing means compares the measured speed of the production line against a minimum production line speed input into and stored within said processing means to permit automatic operation of the apparatus if the measured production line speed exceeds said minimum speed.

23. The apparatus of claim 20, wherein a delay after jog time period is input into and stored within said processing means, wherein said processing means delays the measurement of the top liner board moisture content by said delay time period in response to the movement of the wrap arm of the first pre-heater assembly, and delays the measurement of the bottom liner board moisture content by said delay time period in response to the movement of the wrap arm of the second pre-heater assembly.

24. The apparatus of claim 15, further comprising:
a processing means;
an input/output means in electronic communication with said processing means and said means for measuring the moisture content of the top liner board and of the bottom liner board;
said input/output means being constructed to receive the measured moisture content of the top liner board and of the bottom board in analog form, convert the moisture content readings into digital form, and pass the digital moisture content readings to said processing means, whereupon the processing means then determines whether a difference exists between the measured moisture content of the top liner board and said first setpoint, and whether a difference exists between the measured moisture content of the bottom liner board and said second setpoint.

25. The apparatus of claim 24, wherein said processing means generates a signal to the wrap arm of the first pre-heater assembly in response to the presence of a difference between the measured moisture content of the top liner board and said first setpoint which falls outside of said deadband, and generates a signal to the wrap arm of the second pre-heater assembly in response to the presence of a difference between the measured moisture content of the bottom liner board and said second setpoint which falls outside of said deadband.

* * * * *